(No Model.)
E. T. MUELLER.
REAMER ATTACHMENT FOR DIE STOCKS.
No. 431,610. Patented July 8, 1890.
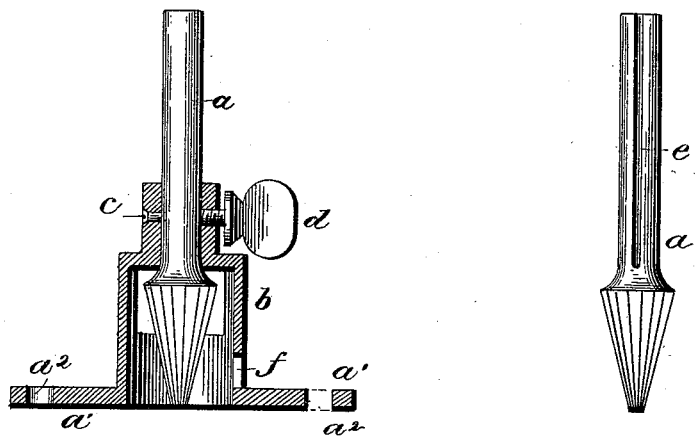
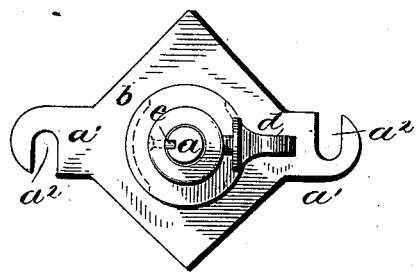
Witnesses
L. C. Hills
E. H. Bond
Inventor
Emil T. Mueller
per Chas. H. Fowler
Attorney

UNITED STATES PATENT OFFICE.

EMIL TRAUGOTT MUELLER, OF LA CROSSE, WISCONSIN.

REAMER ATTACHMENT FOR DIE-STOCKS.

SPECIFICATION forming part of Letters Patent No. 431,610, dated July 8, 1890.

Application filed January 28, 1890. Serial No. 338,430. (No model.)

*To all whom it may concern:*

Be it known that I, EMIL TRAUGOTT MUELLER, a citizen of the United States, residing at La Crosse, in the county of La Crosse and State of Wisconsin, have invented a new and useful Reamer Attachment for Die-Stocks, of which the following is a specification.

My invention relates to improvements in a reaming attachment which can be attached to any screw-plate or die-stock used for threading steam, gas, or water pipe. The object is to ream out the burr at the end of the pipe or pipes caused by the cutting-off tool, the pipe being reamed at the same time that a thread is being cut on it. I attain this object by the mechanism illustrated in the accompanying drawings, in which—

Figure 1 is a vertical section through the holder with the reamer held therein. Fig. 2 is a side view of the reamer detached. Fig. 3 is a top plan of Fig. 1.

Like letters of reference indicate like parts in all the views.

In the drawings, $b$ designates the body or reamer-head with reamer $a$ in place. This body is formed with a base-plate or flange $a'$, formed with oppositely-extending hooks $a^2$, through which the securing devices may be passed. The reamer is prevented from turning by the stud $c$. Said stud engages in a slot $e$ of said reamer, as shown in Fig. 3. The reamer is held in place by a thumb-screw $d$, said thumb-screw being a little beveled on end, so as to fit in a small socket made at different intervals in the side of the reamer, according to the distance said reamer is up or down in the head.

$f$ shows an opening around the reamer-body for the chips or metal cuttings to drop out. The foot or bottom plate is made same shape as the ordinary plate used to hold the die in place, with the exception of a notch or throat being cut in on each end, the threads being cut one on the right and one on the left side of said plate. Screws on the die-stock engage in these throats and hold the reamer-body in place.

The reamer $a$ can be made of any size to fit all the different die or pipe stocks now made.

This invention provides a useful and convenient device for reaming out steam, gas, or water pipe at the same time a thread is being cut on the pipe. This device successfully removes the burr which is formed at the end of the pipe caused by the cutting-off tool.

Having thus described my invention, what I claim as new, and desire to secure by Letters Patent, is—

1. The body $b$, formed with flange $a'$, and neck with stud $c$, combined with the reamer having longitudinal groove $e$, and the thumb-screw $d$, passed through the neck and engaging the shank of the reamer.

2. The body $b$, having cylindrical chamber portion and flange $a'$, and neck with stud $c$, combined with the reamer having longitudinal groove $e$, the body being formed with opening $f$ near its base, the thumb-screw passed through the neck and engaging the shank of the reamer, substantially as specified.

3. The body $b$, formed with cylindrical body portion, flange $a'$, and oppositely-extending hooks, with openings $f$ through the body near the flange $a'$, combined with the reamer having longitudinal groove $e$, the stud $c$ in the neck of the body engaging said groove, and the thumb-screw passed through the neck and engaging the shank of the reamer, substantially as specified.

EMIL TRAUGOTT MUELLER.

Witnesses:
GEORGE W. VOLNER,
CHAS. B. MILLER.